(12) United States Patent
Huang et al.

(10) Patent No.: US 10,738,916 B2
(45) Date of Patent: Aug. 11, 2020

(54) ULTRA-HIGH MOLECULAR WEIGHT POLYETHYLENE ENHANCED HIGH-FLOW DELIVERY HIGH PRESSURE HOSE AND MANUFACTURING METHOD THEREOF

(71) Applicant: ZYFIRE HOSE CORPORATION, Taizhou (CN)

(72) Inventors: Yuzhong Huang, Taizhou (CN); Dongming Bian, Taizhou (CN); Jinma Wang, Taizhou (CN); Xiaohong Zhang, Taizhou (CN); Jun Chen, Taizhou (CN)

(73) Assignee: ZYFIRE HOSE CORPORATION, Taizhou (CN)

( * ) Notice: Subject to any disclaimer, the term of this patent is extended or adjusted under 35 U.S.C. 154(b) by 0 days.

(21) Appl. No.: 15/770,498

(22) PCT Filed: Dec. 15, 2016

(86) PCT No.: PCT/CN2016/110039
§ 371 (c)(1),
(2) Date: Apr. 24, 2018

(87) PCT Pub. No.: WO2018/000754
PCT Pub. Date: Jan. 4, 2018

(65) Prior Publication Data
US 2019/0056046 A1    Feb. 21, 2019

(30) Foreign Application Priority Data

Jun. 29, 2016  (CN) .......................... 2016 1 0499335

(51) Int. Cl.
*F16L 11/08*    (2006.01)
*C08L 7/00*    (2006.01)
(Continued)

(52) U.S. Cl.
CPC ............. *F16L 11/08* (2013.01); *B29C 48/022* (2019.02); *B29C 48/09* (2019.02); *B29C 48/10* (2019.02);
(Continued)

(58) Field of Classification Search
CPC ....... F16L 11/08; F16L 11/04; B29C 48/9105; B29C 48/10; B29C 48/21; B29C 48/153;
(Continued)

(56) References Cited

U.S. PATENT DOCUMENTS 6,179,008 B1 * 1/2001 Kawazura ................. B32B 7/12
138/125
6,656,552 B1 * 12/2003 Crouse ..................... B32B 1/08
428/36.91

(Continued)

FOREIGN PATENT DOCUMENTS

CN    202091649 U    12/2011
CN    103612377 A    3/2014
(Continued)

OTHER PUBLICATIONS

Zhonglin Xie et al, Rubber Formulas, the first version, p. 208-209, Chemical Industry Press, Beijing.

*Primary Examiner* — Craig M Schneider
*Assistant Examiner* — David R Deal
(74) *Attorney, Agent, or Firm* — Bayramoglu Law Offices LLC

(57) ABSTRACT

The present invention relates to an ultra-high molecular weight polyethylene enhanced high-flow delivery high-pressure hose and manufacturing method thereof. The hose includes an outer rubber layer, a reinforcing layer and an inner rubber layer from outside to inside. A thickness of the outer rubber layer is 0.3-6.0 mm. A thickness of the reinforcing layer is 1.0-5.0 mm. A thickness of the inner layer is
(Continued)

0.3-5.0 mm. The outer rubber layer and the inner layer are obtained by co-extruding onto the reinforcing layer using a coextrusion equipment. The manufacturing method includes the following steps: rubber mixing, preparing the reinforcing layer, producing a finished product, vulcanizing and pressure testing. The hose of the invention has the advantages of light weight, good flexibility, abrasion resistance, corrosion resistance and good weather fastness. The hose can be connected through a plurality of standard buckles, which is easy to wind up, easy to assemble and disassemble.

2 Claims, 1 Drawing Sheet

(51) Int. Cl.
| | | |
|---|---|---|
| | *C08L 21/00* | (2006.01) |
| | *F16L 11/04* | (2006.01) |
| | *B29C 48/151* | (2019.01) |
| | *B29C 48/09* | (2019.01) |
| | *C08K 5/17* | (2006.01) |
| | *B29C 48/00* | (2019.01) |
| | *C08K 5/13* | (2006.01) |
| | *C08K 5/09* | (2006.01) |
| | *C08L 23/04* | (2006.01) |
| | *B29C 48/91* | (2019.01) |
| | *B29C 48/10* | (2019.01) |
| | *B29C 48/21* | (2019.01) |
| | *B29C 48/153* | (2019.01) |
| | *B32B 1/08* | (2006.01) |
| | *B32B 5/02* | (2006.01) |
| | *B32B 25/08* | (2006.01) |
| | *B32B 25/10* | (2006.01) |
| | *C08J 5/00* | (2006.01) |
| | *B29K 21/00* | (2006.01) |
| | *C08K 3/22* | (2006.01) |
| | *B29K 105/00* | (2006.01) |
| | *C08L 91/06* | (2006.01) |
| | *B29K 23/00* | (2006.01) |
| | *B29K 105/24* | (2006.01) |
| | *B29K 267/00* | (2006.01) |
| | *B29K 507/04* | (2006.01) |
| | *B29K 509/02* | (2006.01) |

(52) U.S. Cl.
CPC ......... *B29C 48/151* (2019.02); *B29C 48/153* (2019.02); *B29C 48/21* (2019.02); *B29C 48/9105* (2019.02); *B32B 1/08* (2013.01); *B32B 5/024* (2013.01); *B32B 25/08* (2013.01); *B32B 25/10* (2013.01); *C08J 5/005* (2013.01); *C08K 5/09* (2013.01); *C08K 5/13* (2013.01); *C08K 5/17* (2013.01); *C08L 7/00* (2013.01); *C08L 21/00* (2013.01); *C08L 23/04* (2013.01); *F16L 11/04* (2013.01); *B29K 2021/00* (2013.01); *B29K 2021/006* (2013.01); *B29K 2023/0683* (2013.01); *B29K 2105/0005* (2013.01); *B29K 2105/0032* (2013.01); *B29K 2105/0044* (2013.01); *B29K 2105/24* (2013.01); *B29K 2267/00* (2013.01); *B29K 2507/04* (2013.01); *B29K 2509/02* (2013.01); *B32B 2262/0276* (2013.01); *B32B 2597/00* (2013.01); *C08J 2307/00* (2013.01); *C08J 2321/00* (2013.01); *C08J 2323/06* (2013.01); *C08J 2327/06* (2013.01); *C08J 2367/00* (2013.01); *C08K 2003/2241* (2013.01); *C08K 2003/2296* (2013.01); *C08K 2201/014* (2013.01); *C08L 91/06* (2013.01); *C08L 2201/08* (2013.01); *C08L 2205/035* (2013.01); *C08L 2205/16* (2013.01); *C08L 2207/068* (2013.01); *Y02A 30/40* (2018.01)

(58) Field of Classification Search
CPC .......... B29C 48/18; B29C 48/15; B32B 1/08; B32B 5/024; B32B 25/024; B32B 25/08; B32B 25/10; B32B 2262/0276; B32B 2597/00; C08J 5/005; C08J 2307/00; C08J 2321/00; C08J 2323/06; C08J 2327/06; C08J 2367/00; C08K 3/22; C08K 3/36; C08K 5/09; C08L 7/00; C08L 21/00; C08L 91/06; C08L 2201/08; C08L 2205/035; C08L 2205/16; Y02A 30/40; B29K 2021/00; B29K 2023/0683; B29K 2105/0032; B29K 2105/0044; B29K 2105/24; B29K 2267/00; B29K 2507/04; B29K 2509/02
USPC ........................................................ 138/126
See application file for complete search history.

(56) References Cited

U.S. PATENT DOCUMENTS

| | | | | |
|---|---|---|---|---|
| 7,951,439 | B2* | 5/2011 | Gong ................. | C08K 3/26 138/126 |
| 8,449,961 | B2* | 5/2013 | Nicolas ............... | B32B 1/08 138/137 |
| 9,040,133 | B2* | 5/2015 | Schubert ............. | C08J 5/046 428/36.3 |
| 9,115,831 | B2* | 8/2015 | Lamontia ........... | F16L 11/086 |
| 2002/0017332 | A1* | 2/2002 | Ishikawa ............ | F16L 11/08 138/126 |
| 2008/0202618 | A1* | 8/2008 | Shinohara .......... | F16L 11/085 138/126 |
| 2008/0202619 | A1* | 8/2008 | Hirai .................. | F16L 11/081 138/126 |
| 2009/0320952 | A1* | 12/2009 | Amma ................ | B32B 1/08 138/126 |
| 2013/0000767 | A1* | 1/2013 | Nonaka .............. | B29C 70/026 138/106 |
| 2015/0330538 | A1* | 11/2015 | Clark .................. | F16L 11/04 244/129.1 |
| 2017/0159850 | A1* | 6/2017 | Wang .................. | F16L 11/085 |

FOREIGN PATENT DOCUMENTS

| | | |
|---|---|---|
| CN | 103732389 A | 4/2014 |
| CN | 103899855 A | 7/2014 |
| CN | 203784495 U | 8/2014 |
| CN | 105221859 A | 1/2016 |
| CN | 105570566 A | 5/2016 |
| CN | 106113530 A | 11/2016 |
| TW | 310300 B | 7/1997 |
| WO | 2008091847 A1 | 7/2008 |

* cited by examiner

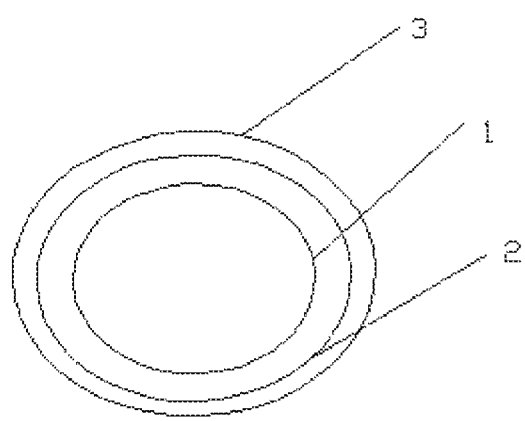

ULTRA-HIGH MOLECULAR WEIGHT POLYETHYLENE ENHANCED HIGH-FLOW DELIVERY HIGH PRESSURE HOSE AND MANUFACTURING METHOD THEREOF

CROSS REFERENCE TO RELATED APPLICATIONS

This application is the national phase entry of International Application No. PCT/CN2016/110039, filed on Dec. 15, 2016, which is based upon and claims priority to Chinese Patent Application No. CN201610499335.1, filed on Jun. 29, 2016, the entire contents of which are incorporated herein by reference.

TECHNICAL FIELD

The present invention relates to a high-pressure hose and manufacturing method thereof, in particular to an ultra-high molecular weight polyethylene enhanced high-flow delivery high-pressure hose and manufacturing method thereof.

BACKGROUND OF THE INVENTION

Thanks to the advantages of flexibility, cushioning, light weight, easy installation, convenience in use, etc., the hose is widely used in fluid transmission lines for petroleum based liquids (such as mineral oil, soluble oil, hydraulic oil, fuel oil and lubricating oil) and water-based liquid (such as emulsion, oil and water emulsion, and water) with a certain pressure and temperature in the fields including mine hydraulic support, oil field development, engineering construction, lifting and transportation, metallurgical and forging, mining equipment, ships, plastic injection machinery, agricultural machinery, different kinds of machine tools, and mechanical and automatic hydraulic system in various industry departments. Ultra-high molecular weight polyethylene enhanced high-flow delivery high pressure hose is the third largest field of polymer materials in industrial technology following the tire and conveyor belt due to its light weight, small package size, easy operation, high environmental adaptability, etc. It can be used for the positive pressure liquid transmission including petroleum products, chemical liquids and water instead of rubber tube, steel tube, etc. And the hose can also be used for conveying ground water and offshore oil up to the ground in the wellbay, mud transport, farmland irrigation, urban fire protection, etc. Further, the hose can be also used as oil (water) pipeline in the field of military logistics. In the armies of the United States, Britain, France, Russia, Australia and other countries, this flat hose has become the main equipment for military logistics liquid transportation. Such hoses have broad application prospects.

With the lack of energy, the development of offshore and shallow oil fields, shale gas exploration become a new energy strategy put on the agenda. A typical shale gas horizontal drilling requires the use of 4,000 to 15,000 $m^3$ of fracturing fluid during drilling with a water content of 90%. The traditional metal pipe has been unable to meet the requirements of oil and gas exploration in shale due to the drawbacks that metal pipes are difficult to bend, install, use and have high maintenance costs. Narrowing the gap or catching up the production and development level of polymer composite hoses with developed countries is conducive for resource conservation and environment protection, which meets the needs of industrial development in China. In order to improve efficiency, large-caliber remote high-pressure delivery has become inevitable. Large-diameter hoses have been used for water transmission in large-scale firefighting. The petroleum, shale gas and gas extraction fields are seeking solutions, wherein metal pipe is usually used in the field or at sea for long-distance transmission. This method has the disadvantages of large laying workload, laying difficulty. More importantly, metal pipes crack easily at the pipe connection and cause leakage and lead to pollution. Due to the reason that the wording pressure of the ordinary large-diameter hose is confined by the material of the enhancement layer, the long transport efficiency of the large diameter hose is low. To solve this problem, some companies use the spinning wheel as the reinforcement layer to produce large-diameter hoses. The working pressure of this kind of hose can be increased to make the high-pressure hose. However, the disadvantages of the product are the poor bending performance of the spinning wheel, great damage in working pressure and short life expectancy. So far, the largest caliber hose in the Chinese market is only 300 mm and the integrally form large-diameter rubber is still blank in China.

SUMMARY OF THE INVENTION

The objective of the present invention is to provide an ultra-high molecular weight polyethylene enhanced high-flow delivery high pressure hose and manufacturing method thereof for the above problems.

The technical solution to solve the technical problems used in the present invention is as follows. An ultra-high molecular weight polyethylene enhanced high-flow delivery high-pressure hose, including an outer rubber layer, a reinforcing layer and an inner rubber layer from outside to inside. A thickness of the outer rubber layer is 0.3-6.0 mm. A thickness of the reinforcing layer is 1.0-5.0 mm. A thickness of the inner rubber layer is 0.3-5.0 mm. The outer rubber layer and the inner rubber layer are obtained by co-extruding onto the reinforcing layer using a coextrusion equipment.

A manufacturing method of an ultra-high molecular weight polyethylene enhanced high-flow delivery high pressure hose, including the following steps:

(1) rubber mixing: a technical formulation of the rubber are as follows by mass fraction: 90-110 parts of rubber, 5-10 parts of zinc oxide, 1-2 parts of stearic acid, 1-2 parts of microcrystalline wax, 2-5 parts of pvc stabilizer, 1-2 parts of antioxidant, 12-20 parts of white carbon black, 5-10 parts of titanium dioxide, 1.5-3 parts of resorcinol, 1.5-3 parts of accelerant hexamethylenetetramine, 1.5-5 parts of resin, 1.5-3 parts of accelerant CZ, 0.4-0.8 parts of accelerant TMTM, 1.8-2.5 parts of sulfur, 15-30 parts of dioctyl phthalate, and the pigment is replenished as needed; putting the above materials, except the sulfur, accelerant TMTM and accelerant CZ, into an internal mixer, wherein the mixing time is greater than or equal to 7 minutes, the discharging temperature is between 100-120° C., and mixing on the open mill for 2-3 times, then entering into the rubber filter for straining, adding accelerants TMTM and CZ into the filtered rubber compound in proportion, sheeting out to obtain a rubber material, cooling and standby for application;

(2) preparing the reinforcing layer: mixing the ultrahigh molecular weight polyethylene and the polyester filament in a certain ratio, wherein a mixing ratio thereof is 0-100%, wherein the ultrahigh molecular weight polyethylene and the polyester filament are made into warps and wefts respectively, braiding into a tubular reinforcing layer using a circular loom;

(3) producing a finished product: putting the reinforcing layer on a core of the coextrusion mold, putting the rubber material in step (1) into an extruder, wherein a temperature of the extruder is set at 45-85° C., starting the extruder, wherein a squeezing speed of the extruder is 10-50 rpm, and then starting the dragger so that the reinforcing layer squeezing out of the coextrusion mold with a base. The rubber material penetrates the reinforcing layer and forms the inner layer along with the base when passing through the coextrusion mold, at the same time, attaching to the surface of the reinforcement layer to become the outer layer. The dragger drags the outer layer to a cooling device in a speed of 2-5 m/min, and then reaches the vulcanization line to be vulcanized;

(4) vulcanizing: applying clamps on two ends of the semi-product of step (3) on the ultralong vulcanization line, steaming on one end, wherein a vapor pressure of the vulcanization is 0.1-0.3 MPa with a time of 10-600 minutes to obtain the finished product;

(5) pressure testing: dragging the product to a dedicated pressure test machine, applying clamps on the two ends, injecting water, testing the product under a pressure of 1.5-2 times of the design pressure to check whether leakage or not.

Further, the rubber in step (1) is natural rubber or all synthetic rubbers.

The beneficial effects of the present invention are as follows:

1. The hose of the invention has the advantages of high strength, long length, large diameter (with a diameter of greater than 400 mm), high pressure resistance (greater than 2.0 Mpa), high efficiency. The hose can bear a high pressure and convey a large flow rate. It is convenient to connect and has a good weather fastness and chemical resistance, which can adapt to different topography. It is flat in non-use state and is easy to wind and unwind with a small storage volume. It is capable of transporting a variety of media with a quick spread and folding speed, which is flexible, environmentally adaptable, safe, reliable and durable. The hose is widely used in the fields of petroleum, chemical, metallurgy, coal, mining, machinery, aviation, etc., for the transport of gas, liquid, slurry or granular material. The ultra-high molecular weight polyethylene is used as a reinforcing layer, which has a high wear resistance, high strength, good flexibility and elastic. Further, the hose can bend in water and has the characteristics of anti-UV, aging-resistant, long service life and good oil resistance, etc. The ability to resist shock, pressure, bending and strength is increased, therefore the hose has a better affordability, which can withstand higher water pressure, especially for some harsh high-pressure pipeline equipment.

2. The hose is integrally formed using the manufacturing method of hose provided in the present invention, the length of the hose is adjustable including 400 mm (16"), 600 mm (24"), 800 mm, 1000 mm, etc. The diameter and length of the hose can also be designed according to the requirements of client.

BRIEF DESCRIPTION OF THE DRAWINGS

FIG. 1 is a schematic structural view of the present invention;

wherein: 1: the outer rubber layer, 2: the reinforcing layer, 3: the inner rubber layer.

DETAILED DESCRIPTION OF THE EMBODIMENTS

The present invention will be further described with reference to the following embodiments:

Embodiment 1

As a first embodiment of the present invention, the present embodiment provides an ultra-high molecular weight polyethylene enhanced high-flow delivery high pressure hose including an outer rubber layer 1, a reinforcing layer 2, and an inner rubber layer 3. A thickness of the outer rubber layer 1 is 0.3 mm, a thickness of the reinforcing layer 2 is 1.0 mm, a thickness of the inner rubber layer 3 is 0.3 mm. The outer rubber layer 1 and the inner rubber layer 3 are obtained by co-extruding to the reinforcing layer 2 via a coextrusion equipment.

The manufacturing method of an ultra-high molecular weight polyethylene enhanced high-flow delivery high pressure hose, including the following steps:

(1) rubber mixing: a technical formulation of the rubber are as follows by mass fraction: 90 parts of rubber, 5 parts of zinc oxide, 1 part of stearic acid, 1 part of microcrystalline wax, 2 parts of pvc stabilizer, 1 part of antioxidant, 12 parts of white carbon black, 5 parts of titanium dioxide, 1.5 parts of resorcinol, 1.5 parts of accelerant hexamethylenetetramine, 1.5 parts of resin, 1.5 parts of accelerant CZ, 0.4 parts of accelerant TMTM, 1.8 parts of sulfur, 15 parts of dioctyl phthalate, and the pigment is replenished as needed; putting the above materials, except the sulfur, accelerant TMTM and accelerant CZ, into an internal mixer, wherein the mixing time is greater than or equal to 7 minutes, the discharging temperature is 100° C., and mixing on the open mill for 2 times, then entering into the rubber filter for straining, adding accelerants TMTM and CZ into the filtered rubber compound in proportion, sheeting out to obtain a rubber material, cooling and standby for application. The rubber in the present embodiment is natural rubber.

(2) preparing the reinforcing layer: mixing the ultrahigh molecular weight polyethylene and the polyester filament in a certain ratio, wherein a mixing ratio of the ultrahigh molecular weight polyethylene to polyester filament is 1:1, wherein the ultrahigh molecular weight polyethylene and the polyester filament are made into warps and wefts respectively, braiding into a tubular reinforcing layer using a circular loom;

(3) producing a finished product: putting the reinforcing layer on a core of the coextrusion mold, putting the rubber material in step (1) into an extruder, wherein a temperature of the extruder is set at 45° C., starting the extruder, wherein a squeezing speed of the extruder is 10 rpm, and then starting the dragger so that the reinforcing layer squeezing out of the coextrusion mold with a base. The rubber material penetrates the reinforcing layer and forms the inner layer along with the base when passing through the coextrusion mold, at the same time, attaching to the surface of the reinforcement layer to become the outer layer. The dragger drags the outer layer to a cooling device in a speed of 2 m/min, and then reaches the vulcanization line to be vulcanized;

(4) vulcanizing: applying clamps on two ends of the semi-product of step (3) on the ultralong vulcanization line, steaming on one end, wherein a vapor pressure of the vulcanization is 0.1 MPa with a time of 10 minutes to obtain the finished product;

(5) pressure testing: dragging the product to a dedicated pressure test machine, applying clamps on the two ends, injecting water, testing the product under a pressure of 1.5 times of the design pressure to check whether leakage or not.

Embodiment 2

An ultra-high molecular weight polyethylene enhanced high-flow delivery high pressure hose including an outer rubber layer, a reinforcing layer, and an inner rubber layer. A thickness of the outer rubber layer is 3 mm, a thickness of the reinforcing layer is 3 mm, a thickness of the inner rubber layer is 2.5 mm. The outer rubber layer and the inner rubber layer are obtained by co-extruding to the reinforcing layer via a coextrusion equipment.

The manufacturing method of an ultra-high molecular weight polyethylene enhanced high-flow delivery high pressure hose, including the following steps:

(1) rubber mixing: a technical formulation of the rubber are as follows by mass fraction: 100 parts of rubber, 7 parts of zinc oxide, 1.5 parts of stearic acid, 1.5 parts of microcrystalline wax, 3.5 parts of pvc stabilizer, 1.5 parts of antioxidant, 16 parts of white carbon black, 7.5 parts of titanium dioxide, 2 parts of resorcinol, 2.3 parts of accelerant hexamethylenetetramine, 3.5 parts of resin, 2.3 parts of accelerant CZ, 0.6 parts of accelerant TMTM, 2.2 parts of sulfur, 20 parts of dioctyl phthalate, and the pigment is replenished as needed; putting the above materials, except the sulfur, accelerant TMTM and accelerant CZ, into an internal mixer, wherein the mixing time is greater than or equal to 7 minutes, the discharging temperature is 110° C., and mixing on the open mill for 3 times, then entering into the rubber filter for straining, adding accelerants TMTM and CZ into the filtered rubber compound in proportion, sheeting out to obtain a rubber material, cooling and standby for application. The rubber in the present embodiment is synthetic rubber.

(2) preparing the reinforcing layer: making the ultrahigh molecular weight polyethylene fiber into warps and wefts respectively, braiding into a tubular reinforcing layer using a circular loom;

(3) producing a finished product: putting the reinforcing layer on a core of the coextrusion mold, putting the rubber material in step (1) into an extruder, wherein a temperature of the extruder is set at 65° C., starting the extruder, wherein a squeezing speed of the extruder is 30 rpm, and then starting the dragger so that the reinforcing layer squeezing out of the coextrusion mold with a base. The rubber material penetrates the reinforcing layer and forms the inner layer along with the base when passing through the coextrusion mold, at the same time, attaching to the surface of the reinforcement layer to become the outer layer. The dragger drags the outer layer to a cooling device in a speed of 3.5 m/min, and then reaches the vulcanization line to be vulcanized;

(4) vulcanizing: applying clamps on two ends of the semi-product of step (3) on the ultralong vulcanization line, steaming on one end, wherein a vapor pressure of the vulcanization is 0.2 MPa with a time of 300 minutes to obtain the finished product;

(5) pressure testing: dragging the product to a dedicated pressure test machine, applying clamps on the two ends, injecting water, testing the product under a pressure of 1.7 times of the design pressure to check whether leakage or not.

Embodiment 3

An ultra-high molecular weight polyethylene enhanced high-flow delivery high pressure hose including an outer rubber layer, a reinforcing layer, and an inner rubber layer. A thickness of the outer rubber layer is 6 mm, a thickness of the reinforcing layer is 5.0 mm, a thickness of the inner rubber layer is 5.0 mm. The outer rubber layer and the inner rubber layer are obtained by co-extruding to the reinforcing layer via a coextrusion equipment.

The manufacturing method of an ultra-high molecular weight polyethylene enhanced high-flow delivery high pressure hose, including the following steps:

(1) rubber mixing: a technical formulation of the rubber are as follows by mass fraction: 110 parts of rubber, 10 parts of zinc oxide, 2 parts of stearic acid, 2 parts of microcrystalline wax, 5 parts of pvc stabilizer, 2 parts of antioxidant, 20 parts of white carbon black, 10 parts of titanium dioxide, 3 parts of resorcinol, 3 parts of accelerant hexamethylenetetramine, 5 parts of resin, 3 parts of accelerant CZ, 0.8 parts of accelerant TMTM, 2.5 parts of sulfur, 30 parts of dioctyl phthalate, and the pigment is replenished as needed; putting the above materials, except the sulfur, accelerant TMTM and accelerant CZ, into an internal mixer, wherein the mixing time is greater than or equal to 7 minutes, the discharging temperature is 120° C., and mixing on the open mill for 3 times, then entering into the rubber filter for straining, adding accelerants TMTM and CZ into the filtered rubber compound in proportion, sheeting out to obtain a rubber material, cooling and standby for application.

(2) preparing the reinforcing layer: making the ultrahigh molecular weight polyethylene fiber into warps and wefts respectively, braiding into a tubular reinforcing layer using a circular loom;

(3) producing a finished product: putting the reinforcing layer on a core of the coextrusion mold, putting the rubber material in step (1) into an extruder, wherein a temperature of the extruder is set at 85° C., starting the extruder, wherein a squeezing speed of the extruder is 50 rpm, and then starting the dragger so that the reinforcing layer squeezing out of the coextrusion mold with a base. The rubber material penetrates the reinforcing layer and forms the inner layer along with the base when passing through the coextrusion mold, at the same time, attaching to the surface of the reinforcement layer to become the outer layer. The dragger drags the outer layer to a cooling device in a speed of 5 m/min, and then reaches the vulcanization line to be vulcanized;

(4) vulcanizing: applying clamps on two ends of the semi-product of step (3) on the ultralong vulcanization line, steaming on one end, wherein a vapor pressure of the vulcanization is 0.3 MPa with a time of 600 minutes to obtain the finished product;

(5) pressure testing: dragging the product to a dedicated pressure test machine, applying clamps on the two ends, injecting water, testing the product under a pressure of 2 times of the design pressure to check whether leakage or not.

The invention claimed is:

1. A manufacturing method of an ultra-high molecular weight polyethylene enhanced high-flow delivery high pressure hose, comprising the following steps:

(1) rubber mixing wherein a technical formulation of a rubber is by mass fraction 90-110 parts of the rubber, 5-10 parts of zinc oxide, 1-2 parts of stearic acid, 1-2 parts of a microcrystalline wax, 2-5 parts of a PVC stabilizer, 1-2 parts of an antioxidant, 12-20 parts of a white carbon black, 5-10 parts of titanium dioxide, 1.5-3 parts of a resorcinol, 1.5-3 parts of hexamethylenetetramine as an accelerant, 1.5-5 parts of a resin, 1.5-3 parts of an accelerant CZ, 0.4-0.8 parts of an accelerant TMTM, 1.8-2.5 parts of sulfur, 15-30 parts of dioctyl phthalate, and a pigment is replenished, comprising:

putting the technical formulation, except the sulfur, the accelerant TMTM and the accelerant CZ, into an internal mixer, and mixing on an open mill for 2-3 times, wherein a mixing time is greater than or equal to 7 minutes, and a discharging temperature is between 100-120° C., entering into a rubber filter for straining, adding the accelerant TMTM and the accelerant CZ into—a filtered rubber compound in proportion, sheeting out to obtain a rubber material, and cooling and standing by for application;

(2) preparing the reinforcing layer, comprising:

mixing an ultrahigh molecular weight polyethylene and a polyester filament in a certain ratio, wherein a mixing ratio thereof is 0-100%, wherein the ultrahigh molecular weight polyethylene and the polyester filament are made into warps and wefts respectively, and braiding into a tubular reinforcing layer using a circular loom;

(3) co-extruding, comprising:

putting the reinforcing layer on a core of a coextrusion mold, putting the rubber material in step (1) into an extruder, wherein a temperature of the extruder is set at 45-85° C., starting the extruder, wherein a squeezing speed of the extruder is 10-50 rpm, and then starting a dragger so that the reinforcing layer squeezes out of the coextrusion mold with a base, wherein the rubber material penetrates the reinforcing layer and forms the inner rubber layer along with the base when passing through the coextrusion mold, at the same time, attaching to a surface of the reinforcement layer to become the outer rubber layer, and wherein the dragger drags the outer rubber layer to a cooling device in a speed of 2-5 m/min, and then reaches a vulcanization line to be vulcanized;

(4) vulcanizing, comprising:

applying clamps on two ends of a semi-product of step (3) on an ultralong vulcanization line, steaming on one end, wherein a vapor pressure of a vulcanization is 0.1-0.3 MPa with a time of 10-600 minutes to obtain a finished product;

(5) pressure testing, comprising:

dragging the finished product to a dedicated pressure test machine, applying clamps on two ends, injecting water, testing the finished product under a pressure of 1.5-2 times of a design pressure to check leakage, wherein the ultra-high molecular weight polyethylene enhanced high-flow delivery high pressure hose comprises the outer rubber layer, the reinforcing layer and the inner rubber layer from outside to inside; wherein a thickness of the outer rubber layer is 0.3-6.0 mm, a thickness of the reinforcing layer is 1.0-5.0 mm, a thickness of the inner rubber layer is 0.3-5.0 mm; the outer rubber layer and the inner rubber layer are obtained by co-extruding onto the reinforcing layer using a coextrusion equipment.

2. The manufacturing method of claim 1, wherein the rubber in step (1) is a natural rubber or a synthetic rubber.

* * * * *